United States Patent
Maruoka

(10) Patent No.: US 6,661,680 B2
(45) Date of Patent: Dec. 9, 2003

(54) HIGHER HARMONIC SUPPRESSOR ELEMENT AND DC POWER SUPPLY UNIT USING THE SAME

(75) Inventor: Kazutoshi Maruoka, Gunma (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/010,417

(22) Filed: Dec. 6, 2001

(65) Prior Publication Data

US 2002/0071297 A1 Jun. 13, 2002

(30) Foreign Application Priority Data

Dec. 8, 2000 (JP) ........................... 2000-374514

(51) Int. Cl.$^7$ .............................. H02M 1/12; H02J 1/10
(52) U.S. Cl. ........................ 363/48; 307/105; 361/19
(58) Field of Search .................. 363/48, 49, 56, 363/86, 95, 98, 161, 47; 307/105, 11; 361/40, 41, 42, 19, 104, 45; 505/879, 884, 885; 174/15.4

(56) References Cited

U.S. PATENT DOCUMENTS

| | | | |
|---|---|---|---|
| 3,927,350 A | * 12/1975 | McConnell | 361/10 |
| 4,015,168 A | * 3/1977 | Massar | 361/19 |
| 6,239,957 B1 | * 5/2001 | McDougall et al. | 361/19 |
| 6,262,871 B1 | * 7/2001 | Nemir et al. | 361/42 |

FOREIGN PATENT DOCUMENTS

| JP | S59-25528 | 2/1984 |
|---|---|---|
| JP | S59-41115 | 3/1984 |
| JP | S59-149732 | 8/1984 |
| JP | 59-149771 | 8/1984 |
| JP | S59-155836 | 10/1984 |
| JP | 60-11411 | 1/1985 |
| JP | 60-27415 | 2/1985 |
| JP | 60-174488 | 11/1985 |
| JP | 63-33540 | 3/1988 |
| JP | 64-026367 | 1/1989 |
| JP | 05-135964 | 6/1993 |
| JP | 08-136591 | 5/1996 |
| JP | 10-042450 | 2/1998 |
| JP | 11-135250 | 5/1999 |

* cited by examiner

Primary Examiner—Rajnikant B. Patel
(74) Attorney, Agent, or Firm—Katten Muchin Zavis Rosenman

(57) ABSTRACT

A higher harmonic suppressor element 10 includes a higher harmonic coil 12 for suppressing a higher harmonic and a thermal fuse 14 which is connected in series with the higher harmonic coil 12 and also which is melted down by heat generated by the higher harmonic coil 12. The higher harmonic coil 12 and the thermal fuse 14 are both contained in the same envelope body 16. Also, the higher harmonic coil 12 is equipped with a magnetic core 121 and a winding 122 wound around the magnetic core 121. In this configuration, the thermal fuse 14 is in tight contact with the magnetic core by means of an adhesive agent etc. If an over-current flows through the higher harmonic coil 12, it runs hot to thereby melt down the thermal fuse 14. With the melting down of the thermal fuse 14, which is connected in series with the higher harmonic coil 12, the over-current flow to the higher harmonic coil 12 is blocked.

14 Claims, 4 Drawing Sheets

HIGHER HARMONIC SUPPRESSOR ELEMENT AND DC POWER SUPPLY UNIT USING THE SAME

BACKGROUND OF THE INVENTION

1. Field of the Invention

The present invention relates to a higher harmonic suppressor element for suppressing a higher harmonic and a DC power supply using the same.

2. Description of the Related Art

FIG. 4 shows a circuit diagram of conventional DC power supply unit. The following will describe the prior art with reference to FIG. 4.

The conventional DC power supply unit 50 is comprised of an AC power supply 52, a voltage selection switch 54 for selecting either one of a 100-V AC voltage and a 200-V AC voltage applied by the AC power supply 52, a rectifying/smoothing circuit 56 for rectifying and smoothing a 100-V AC voltage by the double voltage rectification method if it is selected by the voltage selection switch 54 and rectifying and smoothing a 200-V AC voltage by the equi voltage rectification method if it is selected by the voltage selection switch 54, and a higher harmonic coil 58 which is interposed between the AC power supply 52 and the rectifying/smoothing circuit 56 only when a 200-V AC voltage is selected by the voltage selection switch 54.

The DC power supply unit 50 further includes a filter circuit 60 for canceling noise from an AC voltage, wherein the filter circuit 60 is interposed between the higher harmonic coil 58 and the AC power supply 52. The filter circuit 60 is of a typical type including a coil, a capacitor and a resistor. On an output side of the rectifying/smoothing circuit 56 is provided with a supply voltage control circuit 62 for controlling an output voltage at a constant value. The supply voltage control circuit 62 is a typical type including a switching transistor, an output transformer, a capacitor, a resistor.

The rectifying/smoothing circuit 56 is comprised of bridge-connected rectifying diodes 561–564 and a pair of serial-connected smoothing capacitors 565 and 566. The voltage selection switch 54 is connected between an interconnection point of the capacitors 565 and 566 and one output terminal of the filter circuit 60. The higher harmonic coil 58 has such a frequency characteristic that suppresses a higher harmonic.

The commercially available AC power supply 52 comes in a 100-V type or a 200-V type. To use the 200-V AC power supply 52, the voltage selection switch 54 is opened. In this case, a positive half-wave of the AC voltage flows through the higher harmonic coil 58, the diode 563, the capacitor 565, the capacitor 566, and the diode 562 in this order, while a negative half-wave thereof flows through the diode 564, the capacitor 565, the capacitor 566, the diode 561, and the higher harmonic coil 58 in this order. That is, the 200-V AC voltage is rectified and smoothed by the equi voltage rectification method.

To use the 100-V AC power supply 52, on the other hand, the voltage selection switch 54 is closed. In this case, the positive half-wave flows through the voltage selection switch 54, capacitor 566, the diode 562 in this order, while the negative half-wave flows through the diode 564, the capacitor 565, and the voltage selection switch 54 in this order. That is, a 100-V AC voltage is rectified and smoothed by the double voltage rectification method. Thus, the DC power supply unit 50 gives the same output voltage irrespective of which one of the 100-V and 200-V AC power supplies 52 is used.

Suppose that the voltage selection switch 54 is opened mistakenly when the 100-V AC power supply 52 is used. Then, the rectifying/smoothing circuit 56 rectifies and smoothes a 100-V AC voltage according to the equi voltage rectification method not according to the double voltage rectification method. This causes the supply voltage control circuit 62 to keep the switching transistor ON in an attempt to maintain a predetermined output voltage, thus flowing a mass current to the rectifying/smoothing circuit 56. As a result, an over-current flows also to the higher harmonic coil 58, which is overheated or smokes.

Even when the voltage selection switch 54 is properly set, on the other hand, a short-circuit current may occur owing to a fault or abnormality in the rectifying/smoothing circuit 56 or the supply voltage control circuit 62. In this case also, an over-current flows to the higher harmonic coil 58, which is overheated or smokes.

SUMMARY OF THE INVENTION

In view of the above, it is an object of the present invention to provide a higher harmonic suppressor element that can prevent an over-current from flowing to a higher harmonic coil and a DC power supply using the same.

The higher harmonic suppressor element according to the present invention comprising: a higher harmonic coil for suppressing the higher harmonic; a thermal fuse which is connected in series with said higher harmonic coil and also which is melted down by heat generated by said higher harmonic coil. And said higher harmonic coil is contained in an envelope body along with said thermal fuse. Furthermore, said higher harmonic coil is equipped with a magnetic core and a winding wound around said magnetic core in such a configuration that said thermal fuse is in contact with said magnetic core.

If an over-current flows to the higher harmonic coil, it generates heat to thereby melt down a thermal fuse. With the melting down of the thermal fuse, which is connected in series with the higher harmonic coil, the over-current flow to the higher harmonic coil is cut.

Moreover, a DC power supply unit according to the present invention comprising: a rectifying/smoothing circuit for rectifying and smoothing an AC voltage applied from an AC power supply and the higher harmonic suppressor element which is interposed between said AC power supply and said rectifying/smoothing circuit, wherein the higher harmonic suppressor element including a higher harmonic coil for suppressing a higher harmonic and a thermal fuse which is connected in series with said higher harmonic coil and also which is melted down by heat generated by said higher harmonic coil.

An over-current may flow to the higher harmonic coil owing to a fault or abnormality on the downstream side of the rectifying/smoothing circuit. If an over-current flows to the higher harmonic coil, it runs hot to thereby melt down the thermal fuse. With the melting down of the thermal fuse, which is connected in series with the higher harmonic coil, the over-current flow to the higher harmonic coil is cut.

Further more, a DC power supply unit according to the present invention comprising: a voltage selection switch for selecting either one of a first AC voltage and a second AC voltage which is twice as high as said first AC voltage, wherein each voltage applied from an AC power supply; a rectifying/smoothing circuit for rectifying and smoothing said first AC voltage by the double voltage rectification method if said first AC voltage is selected by said voltage selection switch and, if said second AC voltage is selected by said voltage selection switch, rectifying and smoothing said second AC voltage by the equi voltage rectification method; and the higher harmonic suppressor element which is interposed between said AC power supply and said rectifying/smoothing circuit only when said second AC voltage is selected by said voltage selection switch, wherein the higher harmonic suppressor element including a higher harmonic coil for suppressing a higher harmonic and a thermal fuse which is connected in series with said higher harmonic coil and also which is melted down by heat generated by said higher harmonic coil.

An over-current may flow to the higher harmonic coil owing to a mistake in setting of the voltage selection switch or an abnormality on the downstream side of the rectifying/smoothing circuit. If an over-current flows to the higher harmonic coil, it runs hot to melt down the thermal fuse. With the melting down of the thermal fuse, which is connected in series with the higher harmonic coil, the over-current flow to the higher harmonic coil is cut.

DESCRIPTION OF THE PREFERRED EMBODIMENTS

Figure 1:
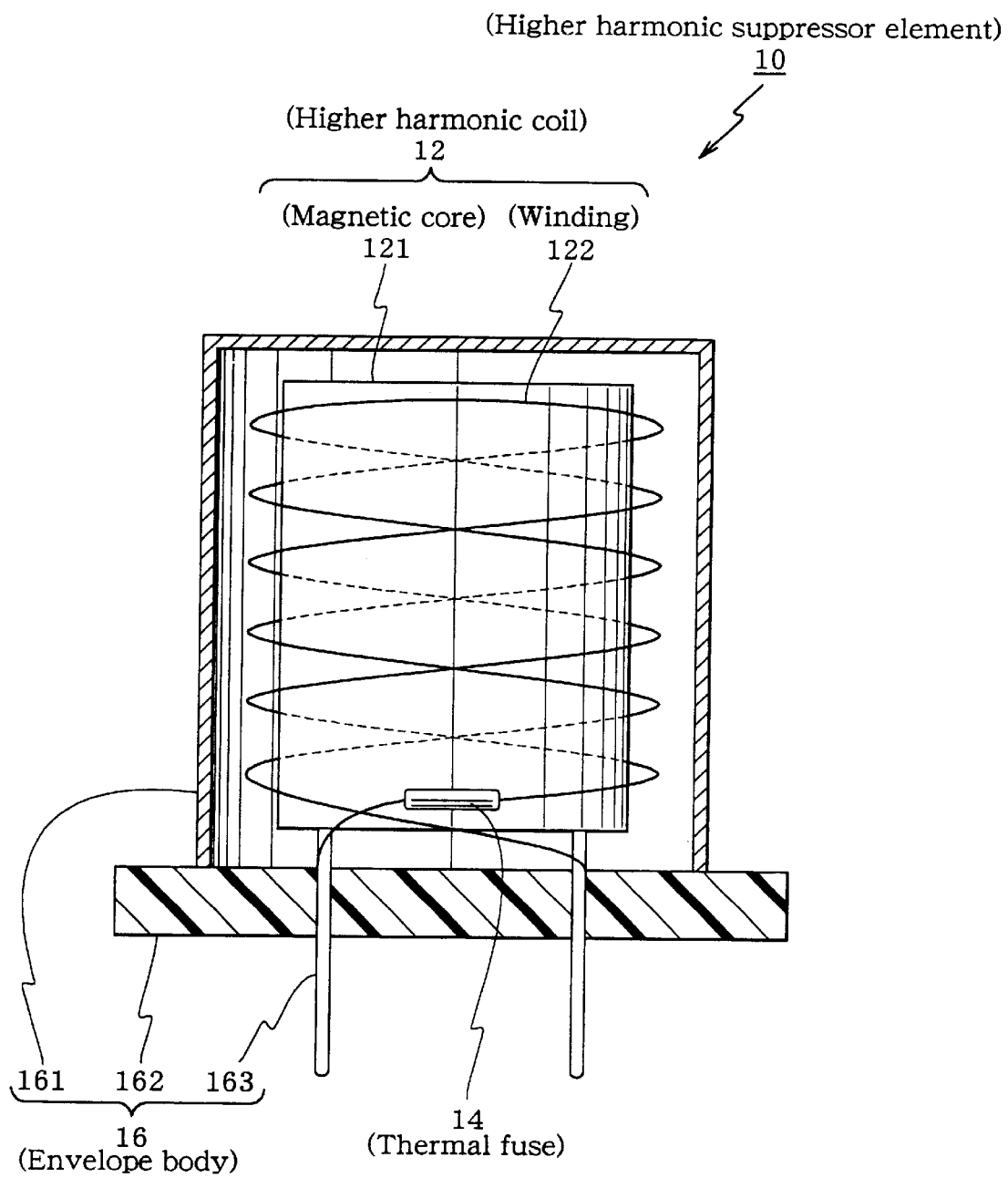
FIG. 1 is a cross-sectional view for showing a higher harmonic suppressor element according to one embodiment of the present invention.

FIG. 1 is a cross-sectional view for showing a higher harmonic suppressor element according to one embodiment of the present invention. The following will describe it with reference to FIG. 1.

A higher harmonic suppressor element 10 of this embodiment includes a higher harmonic coil 12 for suppressing a higher harmonic and a thermal fuse which is connected in series with the higher harmonic coil 12 and which melts down when the higher harmonic coil 12 generates heat. The higher harmonic coil 12 and the thermal fuse 14 are contained in the same envelope body 16. Also, the higher harmonic coil 12 is equipped with a magnetic core 121 and a winding 122 wound around the magnetic core 121. In this configuration, the thermal fuse 14 is in contact with the magnetic core 121 by means of, for example, an adhesive agent. The thermal fuse 14 has such properties that it will melt down completely when it senses a rise in temperature and, once melted down, cannot be restored.

For example, the magnetic core 121 is made of a ferrite, the winding 122 is made of a synthetic enamel copper wire, and the thermal fuse 14 is made of an alloy of lead or tin. The envelope body 16 is comprised of a cylinder 161, a lid 162, and two conducting pins 163 buried in the lid 162. The conducting pins 163 are respectively connected to two ends of a circuit in which the winding 122 and the thermal fuse 14 are interconnected in series.

If an over-current flows to the higher harmonic coil 12, it runs hot to thereby melt down the thermal fuse 14. With the melting down of the thermal fuse, which is connected in series with the higher harmonic coil, the over-current flow to the higher harmonic coil 12 is cut.

Of course, the higher harmonic suppressor element of the present invention is not limited to this embodiment. For example, the thermal fuse may be provided outside the envelope body. The magnetic core and/or the envelope body may be omitted. The thermal fuse may not in contact with the magnetic core as far as it is near the winding, the magnetic core, and the envelope body.

Figure 2:
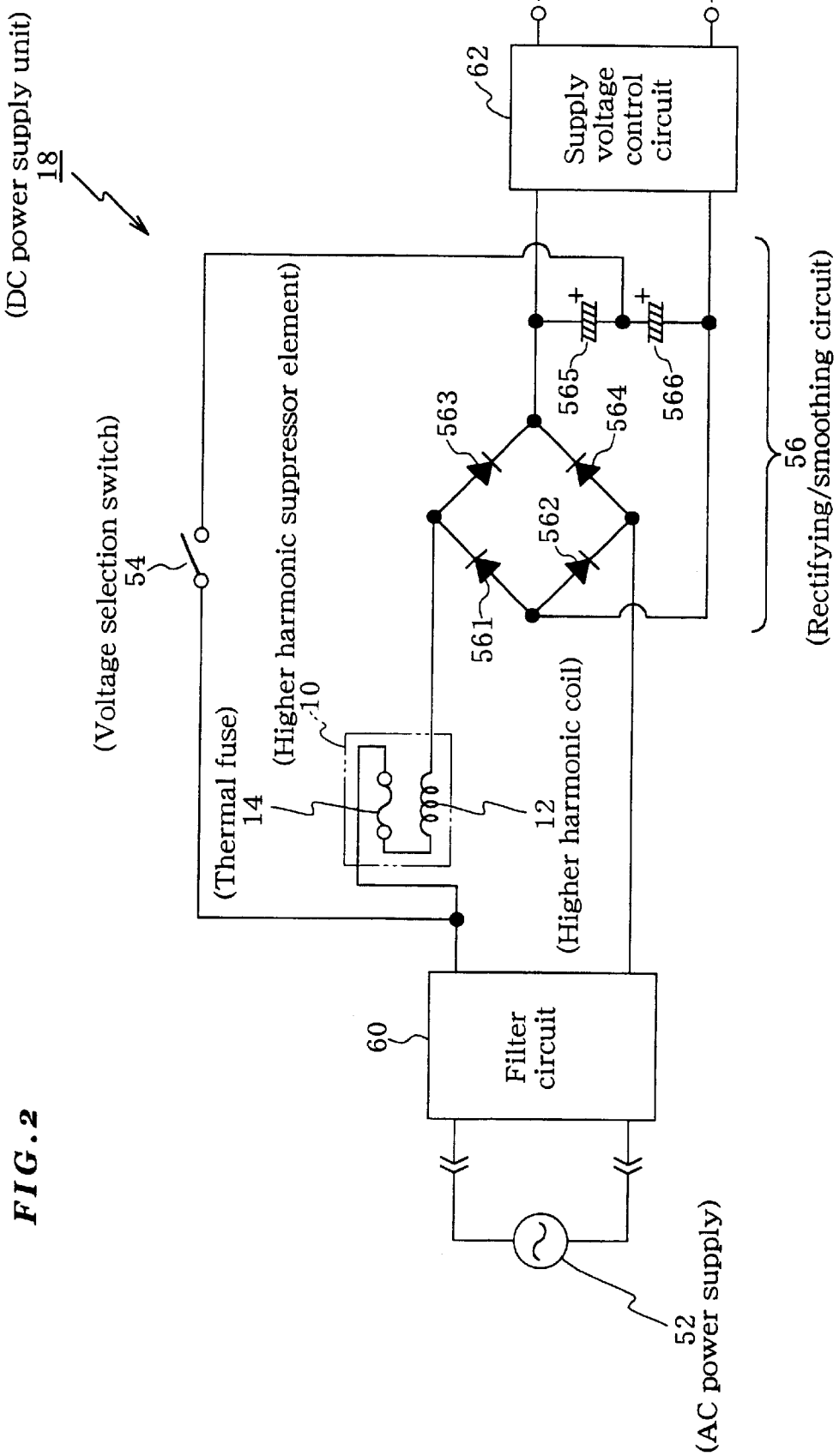
FIG. 2 is a circuit diagram for showing a DC power supply unit according to a first embodiment of the present invention.
Figure 4:
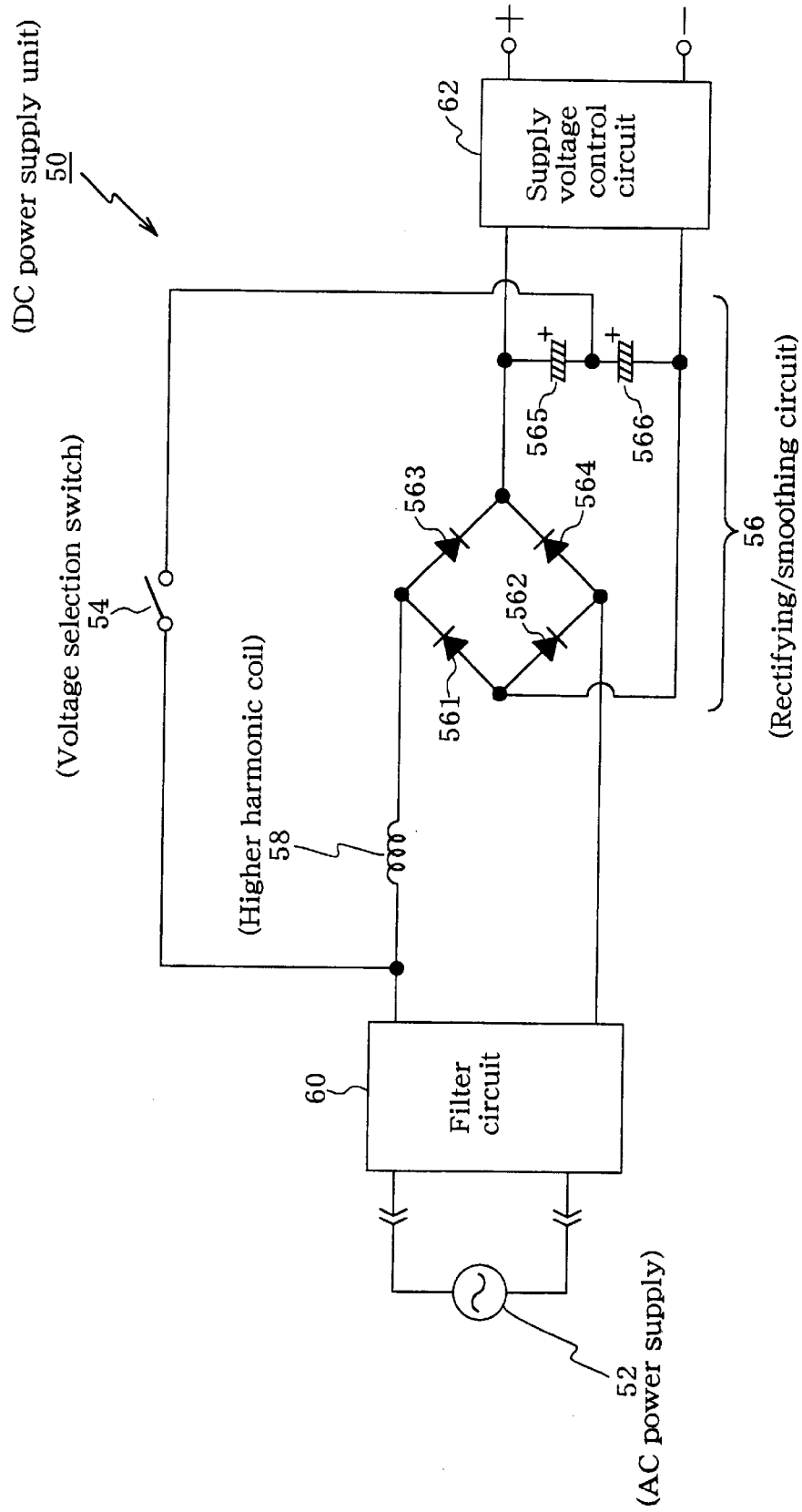
FIG. 4 is a circuit diagram for showing a prior art DC power supply unit.

The following will describe it with reference to FIG. 2. The same components of FIG. 2 as those of FIG. 1 or FIG. 4 are indicated by the same reference numerals and so omitted explanation.

A DC power supply unit 18 of this embodiment includes a voltage selection switch 54 for selecting either one of 100-V and 200-V AC voltages applied from the AC power supply 52, a rectifying/smoothing circuit 56 for rectifying and smoothing a 100-V AC voltage by the double voltage rectification method if that voltage is selected by the voltage selection switch 54 and, if a 200-V AC voltage is selected by that switch 54, rectifying and smoothing that voltage by the equi voltage rectification method, and the higher harmonic suppressor element 10 which is interposed between the AC power supply 52 and the rectifying/smoothing circuit 56 only when a 200-V AC voltage is selected by the voltage selection switch 54.

Suppose that the voltage selection switch 54 is mistakenly opened in an attempt to use the 100-V AC power supply 52. Then, the rectifying/smoothing circuit 56 rectifies and smoothes a 100-V AC voltage by the equi voltage rectification method not by the double voltage rectification method. This causes the supply voltage control circuit 62 to keep the switching transistor ON in order to maintain a predetermined output voltage, thus flowing a mass current to the rectifying/smoothing circuit 56. As a result, an over-current flows also to the higher harmonic coil 58, which in turn runs hot to thereby melt down the thermal fuse 14. With the melting down of the thermal fuse 14, which is connected in series with the higher harmonic coil, the over-current flow to the higher harmonic coil 12 is cut. Thus, the higher harmonic coil 58 can be prevented from being overheated and from smoking.

Figure 3:
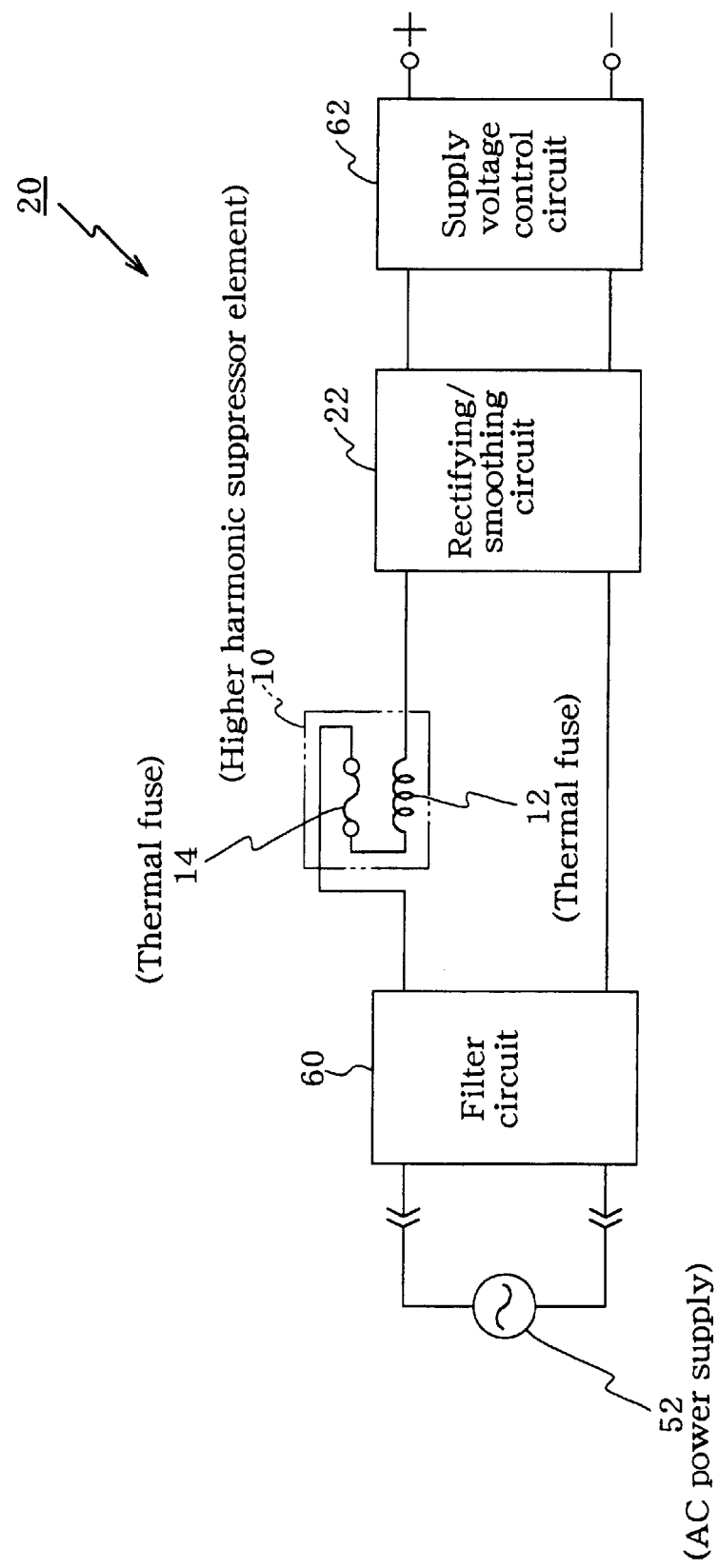
FIG. 3 is a circuit diagram for showing the DC power supply unit according to a second embodiment of the present invention.

Even when the voltage selection switch 54 is properly set, on the other hand, a short-circuit current may occur owing to a fault or abnormality in the rectifying/smoothing circuit 56 or the supply voltage control circuit 62. In this case also, an over-current flows to the higher harmonic coil 12, which in turn runs hot to thereby melt down the thermal fuse 14. Thus, the higher harmonic coil 12 can be prevented from being overheated and from smoking The following will describe about second embodiment, it with reference to FIG. 3. The same components of FIG. 3 as those of FIG. 1 or FIG. 4 are indicated by the same reference numerals and so omitted in explanation.

A DC power supply unit 20 of this embodiment includes a rectifying/smoothing circuit 22 for rectifying and smoothing an AC voltage fed out from the AC power supply 52 and the higher harmonic suppressor element 10 interposed between the AC power supply 52 and the rectifying/smoothing circuit 22.

A short-circuit current may occur owing to a fault or abnormality in the rectifying/smoothing circuit 22 or the supply voltage control circuit 62. In such a case, an over-current flows to the higher harmonic coil 12, which runs hot to thereby melt down the thermal fuse 14. Thus, the higher harmonic coil 12 can be prevented from being overheated and from smoking.

The higher harmonic suppressor element of the present invention includes, in configuration, a higher harmonic coil for suppressing a higher harmonic and a thermal fuse which is connected in series with the higher harmonic coil and also which is melted down by heat generated by the higher harmonic coil when an over-current flows therethrough, thus enabling blocking the over-current flow thereto. Also, the higher harmonic coil is contained in an envelope body along with the thermal fuse, so that the higher harmonic suppressor element can be reduced to almost the same size as that of the higher harmonic coil. Further, the higher harmonic coil is equipped with a magnetic core and a winding wound around the magnetic core in such a configuration that the thermal fuse is in tight contact with the magnetic core, thus enabling effectively transferring heat generated from the higher harmonic coil to the thermal fuse.

Also, a thermal fuse rather than a thermister, which will recover in properties, can be used to easily prevent intermittency in over-current protection. The intermittency refers to repetition of a loop consisting of occurrence of abnormality, protection, avoidance of abnormality by protection, recurrence of abnormality after avoidance, and protection in this order. Further, the present invention can eliminate the necessity of a sensor for detecting a temperature of the higher harmonic coil or a special circuit which is activated for protection upon detection of an abnormality by the sensor, thus reducing the size and the costs.

Also, the DC power supply unit of the present invention includes a rectifying/smoothing circuit for rectifying and smoothing an AC voltage fed out from an AC power supply and such a higher harmonic suppressor element related to the present invention that is interposed between the AC power supply and the rectifying/smoothing circuit, thus enabling blocking a flow of an over-current due to a possible abnormality on the downstream side of the rectifying/smoothing circuit because the thermal fuse is melted down upon occurrence of the abnormality.

Further, the DC power supply unit of the present invention includes a voltage selection switch for selecting either one of a first AC voltage fed out from the AC power supply and a second AC voltage which is twice as high as the first AC voltage, a rectifying/smoothing circuit for rectifying and smoothing the first AC voltage by the double voltage rectification method if that AC voltage is selected by the voltage selection switch and, if the second AC voltage is selected by the voltage selection switch, rectifying and smoothing that AC voltage by the equi-multiple voltage rectification method, and the higher harmonic suppressor element related to the present invention which is interposed between the AC power supply and the rectifying/smoothing circuit only when the second AC voltage is selected by the voltage selection switch, thus enabling blocking such a possible over-current flow to the higher harmonic coil that is caused by a mis-operation of the voltage selection switch or an abnormality encountered on the downstream side of the rectifying/smoothing circuit.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-374514 (filed on Dec. 8, 2000) including specification, claims, drawings and summary are incorporated herein by reference in its entirety. The invention may be embodied in other specific forms without departing from the spirit or essential characteristic thereof.

What is claimed is:

1. A higher harmonic suppressor element comprising:
    a higher harmonic coil for suppressing a higher harmonic; and
    a thermal fuse which is connected in series with said higher harmonic coil and also which is melted down by heat generated by said higher harmonic coil, said higher harmonic suppressor element not comprising an electrical superconductor.

2. The higher harmonic suppressor element according to claim 1, wherein said higher harmonic coil is contained in an envelope body along with said thermal fuse.

3. The higher harmonic suppressor element according to claim 1, wherein said higher harmonic coil is equipped with a magnetic core and a winding wound around said magnetic core in such a configuration that said thermal fuse is in contact with said magnetic core.

4. The higher harmonic suppressor element according to claim 2, wherein said higher harmonic coil is equipped with a magnetic core and a winding wound around said magnetic core in such a configuration that said thermal fuse is in contact with said magnetic core.

5. A DC power supply unit comprising:
    a rectifying/smoothing circuit for rectifying and smoothing an AC voltage applied from an AC power supply; and
    the higher harmonic suppressor element which is interposed between said AC power supply and said rectifying/smoothing circuit, wherein the higher harmonic suppressor element including a higher harmonic coil for suppressing a higher harmonic and a thermal fuse which is connected in series with said higher harmonic coil and also which is melted down by heat generated by said higher harmonic coil, said DC power supply unit not comprising an electrical superconductor.

6. The higher harmonic suppressor element according to claim 5, wherein said higher harmonic coil is contained in an envelope body along with said thermal fuse.

7. The higher harmonic suppressor element according to claim 5, wherein said higher harmonic coil is equipped with a magnetic core and a winding wound around said magnetic core in such a configuration that said thermal fuse is in contact with said magnetic core.

8. A DC power supply unit comprising:
    a voltage selection switch for selecting either one of a first AC voltage and a second AC voltage which is twice as high as said first AC voltage, wherein each voltage is supplied from an AC power supply;
    a rectifying/smoothing circuit for rectifying and smoothing said first AC voltage by the double voltage rectification method if said first AC voltage is selected by said voltage selection switch and, if said second AC voltage is selected by said voltage selection switch, rectifying and smoothing said second AC voltage by the equi voltage rectification method; and
    the higher harmonic suppressor element which is interposed between said AC power supply and said rectifying/smoothing circuit only when said second AC voltage is selected by said voltage selection switch, wherein the higher harmonic suppressor element including a higher harmonic coil for suppressing a higher harmonic and a thermal fuse which is connected in series with said higher harmonic coil and also which is melted down by heat generated by said higher harmonic coil, said DC power supply unit not comprising an electrical superconductor.

9. A DC power supply unit according to claim 8, wherein said higher harmonic coil is contained in an envelope body along with said thermal fuse.

10. A DC power supply unit according to claim 9, wherein said higher harmonic coil is equipped with a magnetic core and a winding wound around said magnetic core in such a configuration that said thermal fuse is in contact with said magnetic core.

11. The DC power supply unit according to claim 8, wherein said first AC voltage is 100 V and said second AC voltage is 200 V.

12. The DC power supply unit according to claim 9, wherein said first AC voltage is 100 V and said second AC voltage is 200 V.

13. The DC power supply unit according to claim 10, wherein said first AC voltage is 100 V and said second AC voltage is 200 V.

14. The higher harmonic suppressor element according to claim 2, wherein said envelope body comprises of a cylinder having an opening at one end thereof, a lid for sealing said opening of said cylinder, and two conducting pins buried in said lid.

* * * * *